Dec. 29, 1931. F. M. HARM Re. 18,303

CIRCULATING DEVICE

Original Filed April 2, 1928

INVENTOR
Franklin M. Harm
BY W. H. Simms
his ATTORNEY

Reissued Dec. 29, 1931 Re. 18,303

UNITED STATES PATENT OFFICE

FRANKLIN M. HARM, OF ROCHESTER, NEW YORK

CIRCULATING DEVICE

Original No. 1,736,593, dated November 19, 1929, Serial No. 266,752, filed April 2, 1928. Application for reissue filed January 28, 1930. Serial No. 424,041.

The present invention relates to a circulating device.

An object of the invention is to provide a circulating device which is simple in construction, inexpensive, strong and durable, and further well adapted to the purpose for which it is designed.

Another object of the invention is to provide a novel means for supporting from the fitting in which the propeller operates, an electric motor for driving the propeller.

Still another object of the invention is to provide a construction in which a motor, a propeller and a closure for a fitting form a unit which may be readily fitted in place or detached without interfering with the hot water system.

Other objects of the invention will become apparent as the nature of the invention proceeds and when taken in connection with the accompaying drawings.

In the accompanying drawings, forming a part of this application like numerals designate like parts throughout the several views.

Figure 1:
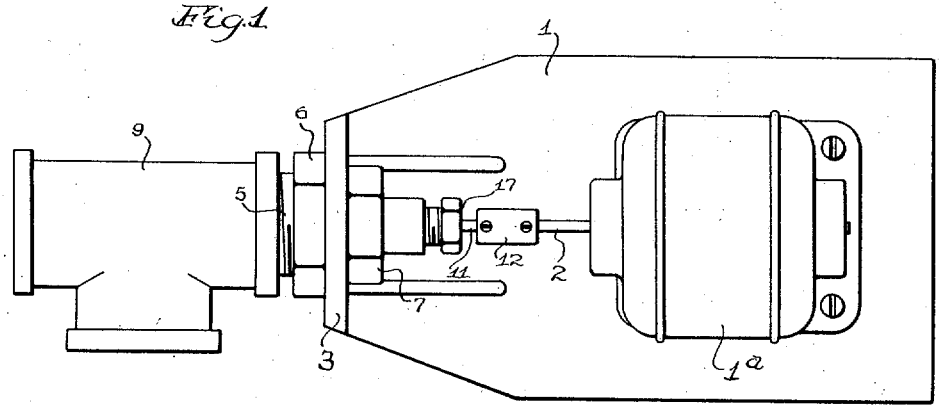
Fig. 1 is a top plan view of the circulating device embodying my invention.

In the drawings, wherein for the purpose of illustration is shown the preferred embodiment of my invention, the numeral 1 designates a substantially right angular or two armed supporting bracket on the base or horizontal arm of which is supported a portable electric motor $1^a$ of any conventional construction.

Figure 2:
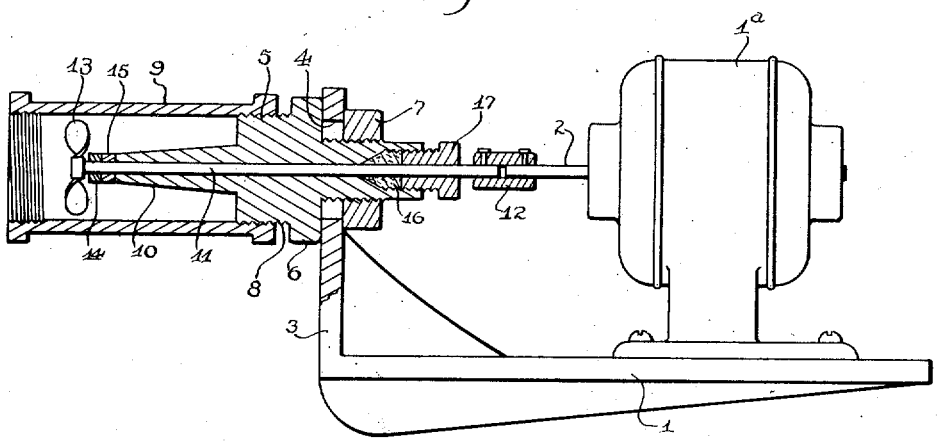
Fig. 2 is a vertical sectional view therethrough.

The drive shaft of the motor is designated by the numeral 2. The vertical arm 3 of the right angular shaped supporting bracket 1 is formed in its upper portion with an enlarged opening 4, through which extends the intermediate portion of a bearing and closure member in the form of a plug 5, as is more clearly disclosed in Fig. 2, said plug being formed with a flange or shoulder 6 that engages with one side face of the vertical arm 3 of the bracket 1, and a lock nut 7 being threaded on the intermediate portion of the plug for engagement with the opposite side of the vertical arm of the bracket to rigidly secure the bracket in a horizontal position.

The inner portion of the bearing closure or plug 5 is externally threaded, as shown at 8, for attachment to a branch of a three branched or T shaped coupling or fitting 9, the other two branches serving as an inlet and outlet. An elongated tapered extension 10 is formed on the inner end of the plug 5 for disposition within the fitting 9 to give extended bearing for the shaft and extending centrally through the plug and said extension is a driven shaft 11, the outer end of which is operatively connected to the drive shaft 2, by the coupling 12.

A liquid circulating propeller 13 is secured on the inner end of the driven shaft 11 for disposition within the fitting 9 adjacent one of the openings in the fitting and suitable thrust collars 14 and 15 may be arranged on the inner end of the driven shaft between the propeller 13 and the smaller end of the tapered extension 10. The thrust collar 14 is preferably formed of steel, while the thrust collar 15 is of bronze. The propeller 13 is preferably of bronze as is also the driven shaft 11.

The outer end of the closure plug 5 is reduced and provides a socket for receiving suitable packing 16, and a packing nut 17 is threaded in the socket for feeding the lubricant to the driven or propeller shaft in the manner well known in the art.

With this invention a closure for a fitting acts to support a motor and a propeller shaft so they are a unit which may be readily fitted to or removed from the fitting. The closure or bearing for the propeller shaft has an externally threaded portion which may be attached to an arm of a three way fitting such as a T fitting and the size of the propeller so that the propeller may be removed from or fitted in the fitting while attached to its shaft. The motor is supported by a bracket which has a motor supporting arm projecting away from the fitting parallel with the propeller shaft and supported by the combined shaft bearing and closure for the fitting. This bracket is adjustable transversely of the propeller shaft on the closure and bearing so that the shaft of the motor can be aligned with the shaft of the propeller, the shaft of the motor being detachably coupled to the shaft of the propeller.

The current of the motor may be automatically controlled by the thermostatic systems operating from the boilers or various parts of the heating systems or by the draft mechanisms controlling the temperature of the boilers, or else by timing arrangement.

When the circulating device is used in conjunction with a hot water heating system, the device will effect the circulation of water through the radiators in such a manner as to bring about a reduction of temperature in the boilers from 180° to 150°, in a very little time, thus indicating that the hot water is being delivered to the radiators where it is, of course, most effective for heating purposes.

The circulating device may also be used to circulate the liquid in a refrigerating system. The simplicity of my device enables the parts to be readily and easily assembled or disassembled and can furthermore be manufactured at a very low cost and be strong and durable.

While I have shown the preferred embodiment of my invention, it is to be understood that minor changes in the size, shape, and arrangement of parts may be resorted to, without departing from the spirit of the invention and the scope of the appended claims.

Having thus described my invention, what I claim as new is:

1. A fluid circulating device comprising, in combination, a T shaped fitting through which a fluid is adapted to flow, an angular motor supporting bracket, the vertical arm of said angular bracket being formed with an enlarged opening, a plug extending through the opening, means for rigidly securing the bracket to the plug, the inner end of the plug being threaded in one end of the T shaped fitting, a reduced extension formed on the inner end of the plug for disposition within the fitting, a driven shaft extending through the plug and said extension, a drive shaft for connection with the outer end of the driven shaft, and a propeller secured on the inner end of the driven shaft for rotation in the fitting adjacent the end of the fitting opposite that in which the plug is disposed.

2. A fluid circulating device comprising a fitting having three openings, one serving as an outlet and another serving as an inlet, a closure and bearing member secured in the third opening, a shaft turning in said closure and bearing, a propeller mounted on the shaft on the inner side of the closure and bearing member, a bracket secured to the closure and bearing member on the outer side of the fitting, said bracket having two angularly arranged arms, one of which is rotatably secured at its end to the closure and bearing and extends transversely of and about the axis of the shaft, and the other extending away from the fitting substantially parallel with the axis of the shaft, and a motor supported on the last mentioned arm and having its shaft connected with the shaft of the propeller.

3. A fluid circulating device comprising a fitting having three openings, one serving as an outlet and another serving as an inlet, a closure and bearing member secured in the third opening, a shaft turning in said closure and bearing, a propeller mounted on the shaft on the inner side of the closure and bearing member, a bracket, a motor supported by the bracket, means for securing the bracket to the closure and bearing for adjustment transversely of the shaft and also about the axis of the shaft relatively to the closure in order to aline the motor shaft with the shaft of the propeller.

4. A fluid circulating device comprising a fitting closure and shaft bearing having two externally threaded portions with a shoulder between them, a shaft mounted to turn in said closure and bearing and projecting from opposite ends thereof, a propeller mounted on one end of the shaft, a motor having connection with the other end of the shaft, a clamping nut arranged on the screw threaded portion between the shoulder and the motor, and a bracket supporting the motor and having a portion held between the shoulder and the nut.

5. A fluid circulating device comprising a fitting having three openings, one serving as an outlet and another serving as an inlet, a combined closure and bearing member secured in the third opening, a shaft turning in said closure and bearing, a propeller mounted on the shaft on the inner side of the closure and bearing member, a bracket rotatably connected to the closure and bearing on the outside of the fitting so that the bracket may be swung on the fitting about the axis of the shaft, and a motor supported solely by the bracket and having its shaft connected to the shaft of the propeller, and means securing said bracket in an adjusted position on the fitting.

6. A fluid circulating device comprising a fitting having three openings, a closure for one of the openings, a shaft mounted to turn on the closure and projecting into the fitting and on the outside of the closure, a motor connected to the outer end of the shaft, a propeller on the inner end of the shaft, a bracket supporting the motor, and a connection between the bracket and the closure having means for effecting the adjustment of the bracket about the axis of the shaft in order that the desired position of the motor may be obtained with reference to the fitting.

FRANKLIN M. HARM.